United States Patent
Wang et al.

(10) Patent No.: US 11,243,354 B2
(45) Date of Patent: Feb. 8, 2022

(54) FLEXIBLE SPLICE PROTECTOR ASSEMBLY AND METHOD FOR PREPARING SAME

(71) Applicant: CommScope Technologies LLC, Hickory, NC (US)

(72) Inventors: Chi Ming Wang, Glen Ellyn, IL (US); Ibrahim M. Elnatour, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/088,326

(22) Filed: Nov. 3, 2020

(65) Prior Publication Data
US 2021/0157055 A1 May 27, 2021

Related U.S. Application Data

(60) Provisional application No. 62/941,110, filed on Nov. 27, 2019.

(51) Int. Cl.
*G02B 6/255* (2006.01)
*G02B 6/44* (2006.01)

(52) U.S. Cl.
CPC ......... *G02B 6/2558* (2013.01); *G02B 6/2557* (2013.01); *G02B 6/2553* (2013.01); *G02B 6/4403* (2013.01)

(58) Field of Classification Search
None
See application file for complete search history.

(56) References Cited

U.S. PATENT DOCUMENTS

| | | | | |
|---|---|---|---|---|
| 4,818,055 A * | 4/1989 | Patterson | ............. | G02B 6/3801 385/98 |
| 5,247,598 A * | 9/1993 | Takimoto | ............. | G02B 6/2821 385/99 |
| 5,731,051 A * | 3/1998 | Fahey | ................. | G02B 6/2558 138/118.1 |
| 6,454,471 B1 * | 9/2002 | Ware | .................... | G02B 6/2558 385/99 |
| 6,499,891 B1 | 12/2002 | Stevenson | | |
| 2004/0247261 A1 * | 12/2004 | Sato | ..................... | G02B 6/2558 385/99 |
| 2007/0206909 A1 | 9/2007 | Wetter et al. | | |

(Continued)

FOREIGN PATENT DOCUMENTS

KR        980010472 A     4/1998

OTHER PUBLICATIONS

"International Search Report and Written Opinion corresponding to International Application No. PCT/US2020/058465 dated Apr. 19, 2021".

*Primary Examiner* — Jerry Rahll
(74) *Attorney, Agent, or Firm* — Myers Bigel, P.A.

(57) ABSTRACT

A method of protecting a fusion splice of first and second fiber optic cables includes:
(a) providing a first member;
(b) providing a second member formed of an activatable material;
(c) positioning the fusion splice adjacent the first member and the second member; and
(d) activating the second member to cause the second member to flow over the fusion splice and to engage the first member such that the activatable material at least partially surrounds the fusion splice.

22 Claims, 3 Drawing Sheets

(56) References Cited

U.S. PATENT DOCUMENTS

| | | |
|---|---|---|
| 2009/0074362 A1 | 3/2009 | Oba |
| 2014/0286615 A1 | 9/2014 | Faulkner et al. |
| 2019/0025516 A1* | 1/2019 | Lichoulas ................ G02B 6/40 |
| 2020/0026018 A1* | 1/2020 | Bryon ................... G02B 6/4458 |
| 2020/0081186 A1* | 3/2020 | Wu ........................ G02B 6/443 |
| 2020/0355870 A1* | 11/2020 | Iida ...................... G02B 6/2558 |
| 2021/0157055 A1* | 5/2021 | Wang ................... G02B 6/4403 |

* cited by examiner

FLEXIBLE SPLICE PROTECTOR ASSEMBLY AND METHOD FOR PREPARING SAME

RELATED APPLICATION

The present application claims priority from and the benefit of U.S. Provisional Patent Application No. 62/941,110, filed Nov. 27, 2019, the disclosure of which is hereby incorporated herein in its entirety.

FIELD OF THE INVENTION

The present invention relates generally to spliced cable and/or spliced optical fiber protectors.

BACKGROUND OF THE INVENTION

Optical fibers of fiber optic cables (either individual fibers or groups of fibers, such as ribbon fibers) are often spliced together to enable the transmission of signals between two cables. Fusion splicing is the process of fusing or welding two fibers together, usually by an electric arc. Fusion splicing is the most widely used method of splicing of optical fibers and fiber optic cables, as it typically provides for the lowest loss and least reflectance, as well as providing the strongest and most reliable joint between two fibers.

It may be desirable to provide techniques for enhancing fusion splicing operations, particularly in the field or in a warehouse.

SUMMARY

As a first aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a lower shell member; an upper shell member that overlies the lower channel to form a shell with a cavity therein; and a member formed of activatable material residing in the upper shell member within the cavity. The splice protector and the exposed portions of optical fibers of the first and second fiber optic cables reside in the cavity.

As a second aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a lower channel having side walls that define a gap; and an upper member formed of activatable material positioned in the gap in the lower channel, the upper member and the lower channel forming a cavity. The splice protector and the exposed portions of the optical fibers of the first and second fiber optic cables reside in the cavity.

As a third aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; first and second members formed of activatable material positioned on opposite sides of the splice protector; and a protective sleeve that surrounds the first and second members and the exposed portions of the optical fibers.

As a fourth aspect, embodiments of the invention are directed to a method of protecting a fusion splice of first and second fiber optic cables. The method comprises the steps of:
 (a) providing a first member;
 (b) providing a second member formed of an activatable material;
 (c) positioning the fusion splice adjacent the first member and the second member; and
 (d) activating the second member to cause the second member to flow over the fusion splice and to engage the first member such that the activatable material at least partially surrounds the fusion splice.

DETAILED DESCRIPTION

Figure 1:
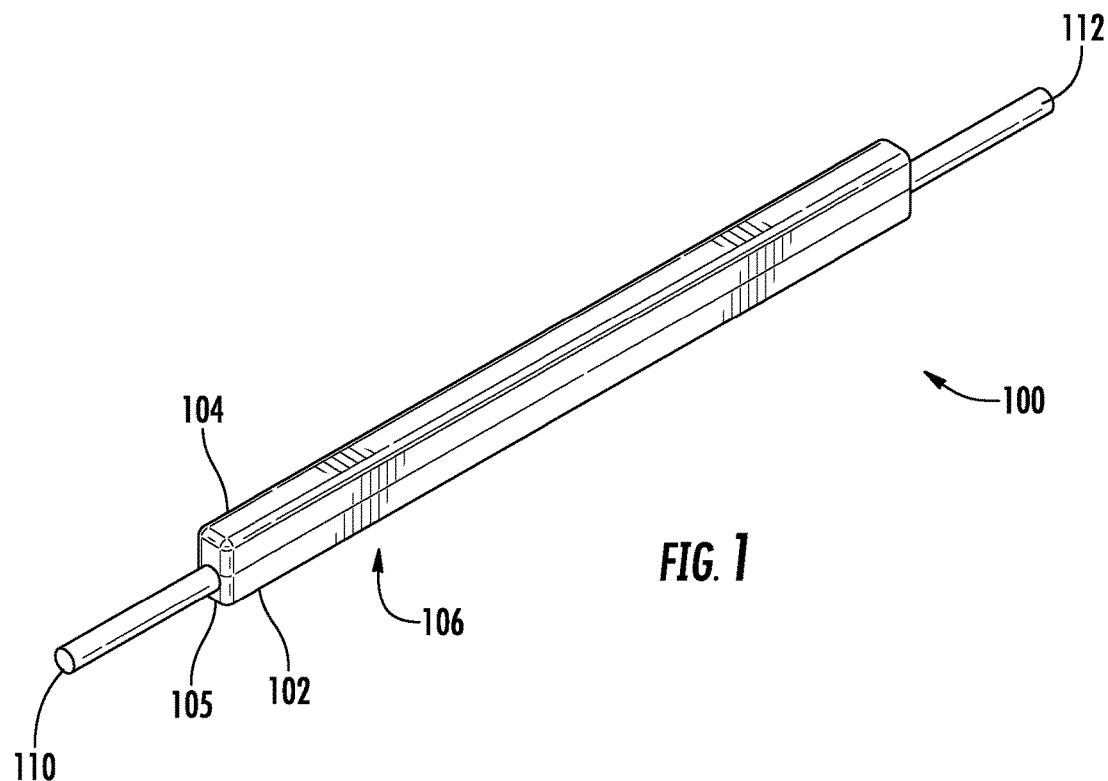
FIG. 1 is a perspective view of a spliced fiber optic assembly according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Embodiments of the invention are directed to techniques and assemblies for performing fusion splicing in the field, in a warehouse, etc. Generally, embodiments employ an outer shell or housing (typically formed of two, three, or more parts) to encapsulate the fusion splice, exposed buffered fibers/ribbons, and input/output cables and strength members. Such a shell can be pre-filled with an activatable material (such as a hot melt adhesive), then activated in the field to bond all the parts together, thereby creating an outdoor weatherproof joint that protects everything. In some embodiments, the fusion-spliced assembly can be relatively compact (compared, for example, with typical splice trays), such that much shorter lengths of fibers (e.g., a total spliced length between the two fibers of 3 to 6 inches) may be spliced.

Activation of the material (by heat or otherwise) can cause the activatable material to flow and thereby protect and cover components of the fusion spliced assemblies. Such components can include the fiber splice and/or a splice protector (if there is one), exposed buffered fiber, portions of the cable, and any strength members or additional component that may be desirable to bond.

In some embodiments it may be desirable to locate one or more component, such as a splice protector, in a specific area. Such location can be achieved with channels or other features in the shell. Channels may also be included to encourage activatable material to flow to certain desired locations.

In some embodiments, the device may fit into built-in heaters found on many fusion splicers. In other embodiments, a separate portable heater or even a heat gun may be used.

With arrangements such as those described above, one benefit is the avoidance of a bulky transition device to protect the fusion splice and the surrounding exposed fibers that may require seals or some kind of post-splice filling process. Additionally, this technique may be sufficiently simple that it can be performed virtually anywhere, and without requiring much, if any, additional tooling (the more complicated process of filling and/or setting the material in the shell can be done in advance elsewhere). By utilizing this method, weatherproofing may be improved, but in addition strength may be added to the joint by bonding the cable and strength members together. Further, the assembly may have a smaller cross-section than other protection methods.

In the figures, the exemplary embodiments are illustrated as a single cable being spliced to a single cable, but the techniques may be used for multiple input/output cables/fibers of varying sizes and scaled or adapted accordingly.

Figure 2:
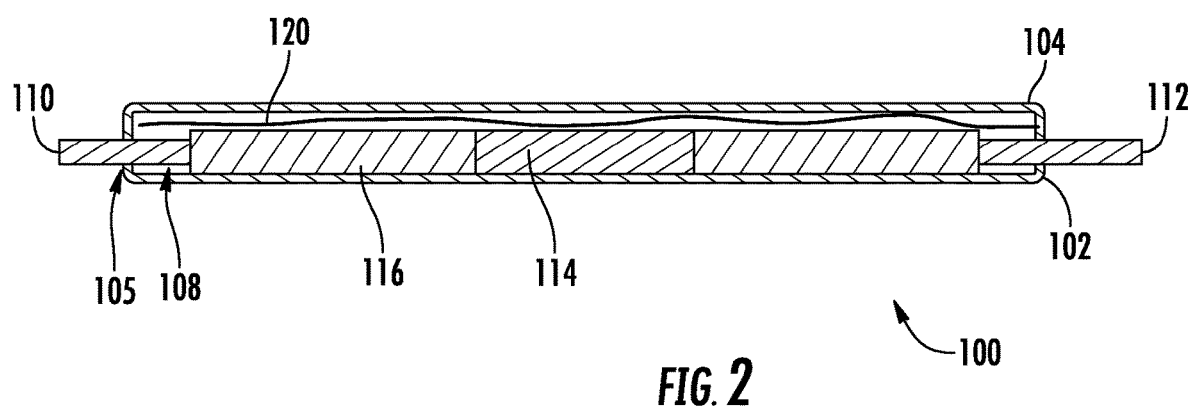
FIG. 2 is a side section view of the assembly of FIG. 1.

Referring now to the drawings, a spliced fiber optic assembly, designated broadly at 100, is shown in FIGS. 1 and 2. The assembly 100 comprises a lower channel 102 and a mating upper channel 104 that combine to form a hollow shell 106. The lower channel 102 has recesses 105 at its ends. Fiber optic cables 110, 112 enter either end of the shell 106 and are spliced within the cavity 108 of the shell 106, as evidenced by a splice protector 114. Exposed (and in some cases buffered) portions of the fibers are protected by sleeves 116. Each of the cables 110, 112 fits within one of the recesses 105.

As can be seen in FIG. 2, an activatable filling material 120 is present in the upper channel 104. As discussed above, the activatable filling material may be in the form of an adhesive (such as a hot melt adhesive) or may be another material that melts or otherwise softens and flows to surround the cables 110, 112 within the cavity 106. Exemplary alternative activatable materials include other adhesives, UV-curable epoxies, two-part epoxies (separated by a dam or other barrier(s)), or the like. Alternatively, the activatable material may be held in a pouch that melts or dissolves when heat or another agent (such as a solvent or UV radiation) is applied to release the material.

The assembly 100 can be assembled by fusion splicing the fiber optic cables 110, 112 in a conventional manner (which may include the application of the splice protector 114 and the sleeves 116). The spliced cables 110, 112 are then laid in the lower channel 102, with the cables 110, 112 in the recesses 105. The upper channel 104 is mated with the lower channel 102. The assembly 100 is then heated or otherwise treated to activate the activatable material 120, which melts and flows around the spliced area (including the splice protector 114 and the exposed portions of the optical fibers on either side of the slice protector 114) to protect these vulnerable components.

Those of skill in this art will appreciate that the assembly 100 may take other forms. For example, either or both of the upper and lower channels 102, 104 may be formed as a member of a different configuration (e.g., the upper member may be a simple panel that fits over the gap in the lower channel) that are assembled to create an external shell. The activatable material may span only a portion of the length of the upper channel 104. Other variations may also be employed.

Figure 3:
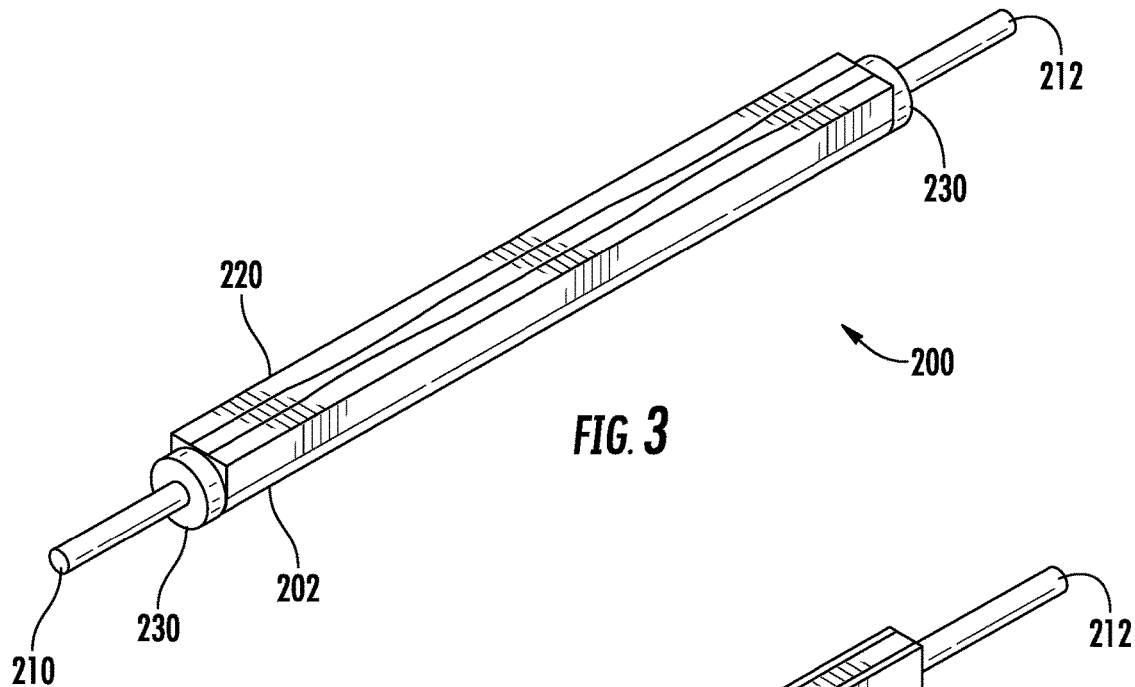
FIG. 3 is a perspective view of a spliced fiber optic assembly according to other embodiments of the invention.
Figure 4:
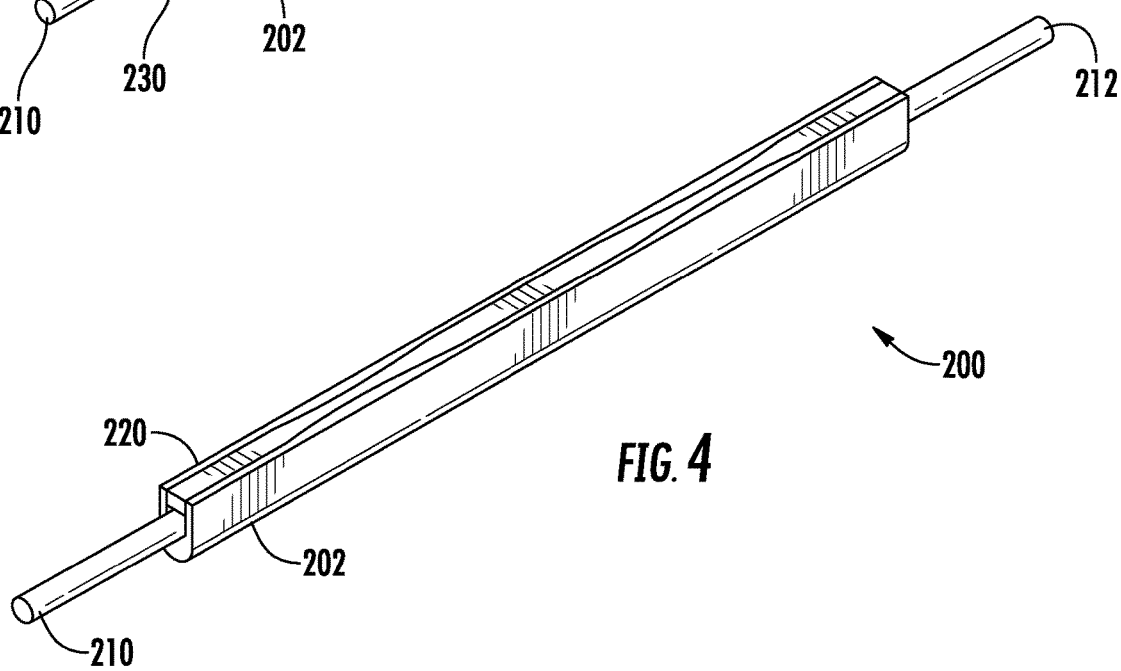
FIG. 4 is a perspective view of the assembly of FIG. 3 with the end caps removed.
Figure 5:
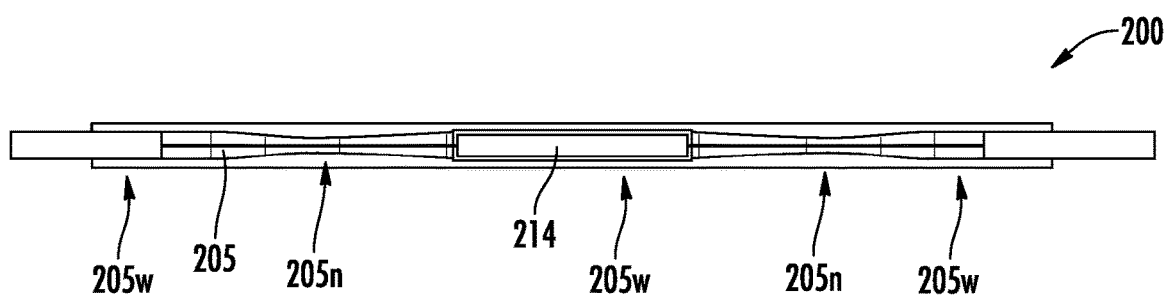
FIG. 5 is a top view of the shell of the assembly of FIG. 3.

Referring now to FIGS. 3-5, another assembly according to embodiments of the invention is shown therein and designated broadly at 200. The assembly 200 includes a lower channel 202 similar to the lower channel 102 described above. Notably, the walls of the lower channel 202 create a gap 205. The gap 205 has two narrowed areas 205*n* that separate three wider areas 205*w*. An upper cover 220 is formed of activatable material. As can be seen in FIGS. 3 and 4, the upper cover 220 is shaped to fit within the upper edges of the lower channel 202 (with narrowed and wider sections) and overlies the cables 210, 212 (which are fusion spliced, as represented by the splice protector 214 in FIG. 5).

The assembly 200 can be assembled by positioning the splice protector 214 in the middle wider area 205w of the gap 205, the exposed portions of the fibers in the narrowed areas 205n, and the jacketed portions of the cables 210, 212 in the outer wider areas 205w (see FIG. 5). The upper cover 220 is then positioned in the gap 205. The assembly 200 is then treated (e.g., by heating) to activate the activatable material of the upper cover 220, which can then flow into the lower channel 202 to protect the vulnerable portions of the cables 210, 212. One potential advantage of the described configuration is that the narrower areas (which typically correspond to the exposed portions fibers of the cables 210, 212), less activatable material is required, which in turn can reduce the risk of improper or misdirected flow of the activatable material after melting.

In some embodiments, the upper cover 220 may be divided into multiple pieces; for example, insertion of the upper cover 220 into the gap 205 may be easier if the upper cover 220 comprises separate pieces for each of the different areas 205n, 205w of the gap 205. As another example, different pieces of the upper cover 220 may be of different thicknesses, depending on which sections of the cables 210, 212 are being protected. Further, in some instances different pieces of the upper cover 220 may be formed of different materials that have different flow characteristics. As an additional example, either or both of the upper cover 220 and the lower channel 202 may include features to direct or assist with material flow. Other variations may also be possible.

In addition, in FIG. 3 the assembly 200 is illustrated with two end caps 230. The end caps 230 may be formed of an activatable material, and when activated will flow to capture the cables 210, 212 at the ends of the assembly 200. In other embodiments, the end caps 230 may be formed of a non-activatable material, such that they serve as barriers or dams to activatable material of the upper cover 220 as it flows.

It can be envisioned that the end caps 230 may be employed with either a two-part shell, such as is shown in FIGS. 1 and 2, or even with a single-piece tube. In the instance of the single-piece tube, the end caps 230 would capture the cables at the ends of the assembly (which would allow the remainder of the cables within the tube to remain loose). In such a design, the tube and/or the end caps 230 may include capturing features that assist with positioning and capturing the end caps 230.

Figure 6:
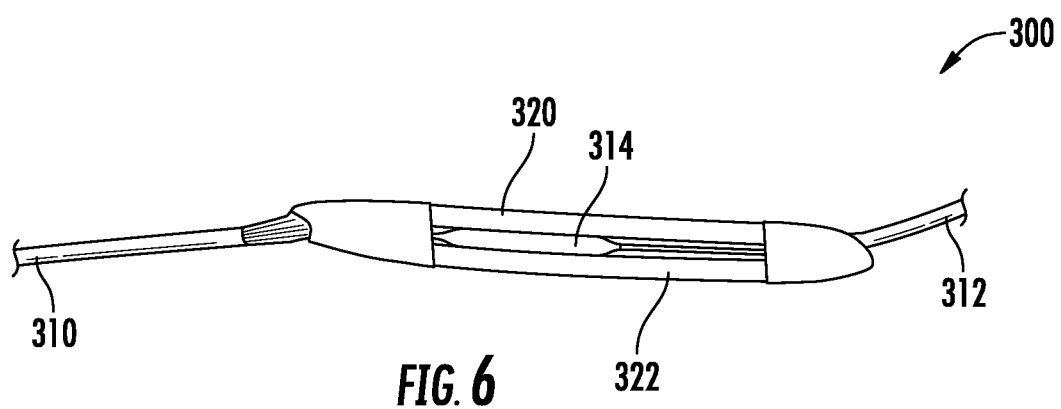
FIG. 6 is a top view of a spliced fiber optic assembly according to further embodiments of the invention with the heat shrink sleeves removed.
Figure 7:
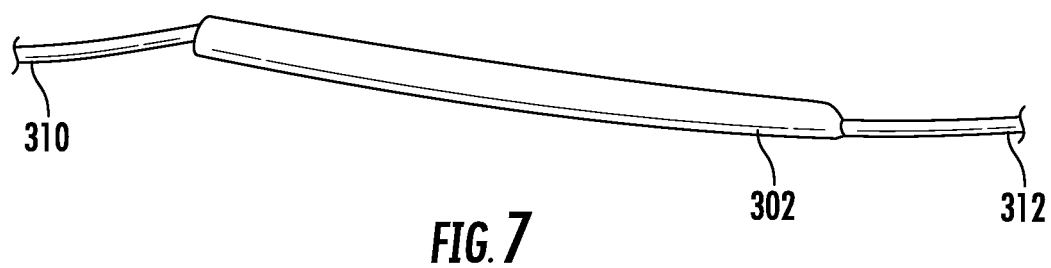
FIG. 7 is a top view of the assembly of FIG. 6.

Referring now to FIGS. 6 and 7, another assembly according to embodiments of the invention is shown therein and designated broadly at 300. The assembly 300 includes cables 310, 312 that are spliced and covered with a splice protector 314.

The assembly 300 also includes two members 320, 322 of activatable material that are positioned on either side of the splice protector 314 and other vulnerable portions of the cables 310, 312 (see FIG. 6). The members 320, 322 may include clips, grooves, ridges or the like that can enable the two members 320, 322 to be secured together around the splice protector 314, etc. The assembly 300 further includes an outer sleeve 302 of heat-shrinkable material that fits over the members 320, 322.

The assembly 300 can be assembled by attaching the members 320, 322 to each other while surrounding the cables 310, 312, sliding the outer sleeve 302 over the members 320, 322, and applying heat; the elevated temperature can both melt the members 320, 322 and cause the outer sleeve 302 to shrink around them. In some embodiments, the conditions under which heat is applied can cause the outer sleeve 302 to shrink relatively uniformly, such that the result is a relatively uniform cylindrical sleeve 302. As such, the outer sleeve 302 can provide a relatively cylindrical "mold" for the members 320, 322 as they are heated.

In some embodiments, an inner half-tube may be included with each of the members 320, 322 that form a full rigid tube when the members 320, 322 are combined. Similarly, an outer tube may be provided over the outer sleeve 302 to provide further protection.

As another alternative example, the pieces of the shells/channels may be formed of a dissolvable or erodible material, or of a material that can be physically removed after setting of the activatable material.

As a further example, more than two members 320, 322 may be desirable in some embodiments. As a specific example, if there are multiple splices, each may be protected by its own pair of activatable members 320, 322, or alternatively one main member 320 may underlie all of the splices and each splice may have its own separate mating member 322. As another example, the activatable members 320, 322 may be clipped together with a third member that is also formed of an activatable material.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly, comprising:
   first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;
   a splice protector that surrounds the splice area of the first and second fiber optic cables;
   a lower shell member;
   an upper shell member that overlies the lower channel to form a shell with a cavity therein; and
   a member formed of activatable material residing in the upper shell member within the cavity;
   wherein the splice protector and the exposed portions of optical fibers of the first and second fiber optic cables reside in the cavity.

2. The assembly defined in claim 1, wherein the member of activatable material is melted and at least partially covers the splice protector.

3. The assembly defined in claim 1, wherein the activatable material comprises a material that is activatable by heat.

4. The assembly defined in claim 3, wherein the activatable material comprises a hot melt adhesive.

5. The assembly defined in claim 1, wherein the lower shell member comprises a channel.

6. The assembly defined in claim 5, wherein the upper shell member comprises a channel.

7. An assembly, comprising:
   first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;

a splice protector that surrounds the splice area of the first and second fiber optic cables;

a lower channel having side walls that define a gap;

an upper member formed of activatable material positioned in the gap in the lower channel, the upper member and the lower channel forming a cavity;

wherein the splice protector and the exposed portions of the optical fibers of the first and second fiber optic cables reside in the cavity.

8. The assembly defined in claim 7, wherein the upper member of activatable material is melted and at least partially covers the splice protector.

9. The assembly defined in claim 7, wherein the activatable material comprises a material that is activatable by heat.

10. The assembly defined in claim 9, wherein the activatable material comprises a hot melt adhesive.

11. The assembly defined in claim 7, wherein the gap includes a wider area in which the splice protector resides and two narrower areas in which the exposed portions of optical fibers reside.

12. The assembly defined in claim 11, further comprising at least one end cap located at an end of the lower channel, the at least one end cap being formed of an activatable material.

13. An assembly, comprising:
first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;

a splice protector that surrounds the splice area of the first and second fiber optic cables;

first and second members formed of activatable material positioned on opposite sides of the splice protector; and a protective sleeve that surrounds the first and second members and the exposed portions of the optical fibers.

14. The assembly defined in claim 13, wherein the activatable material comprises a material that is activatable by heat.

15. The assembly defined in claim 14, wherein the activatable material comprises a hot melt adhesive.

16. The assembly defined in claim 13, wherein the sleeve comprises a heat-shrink sleeve.

17. The assembly defined in claim 13, wherein the first and second members include securing features that are configured to maintain the first and second members in a secured condition.

18. A method of protecting a fusion splice of first and second fiber optic cables, comprising:
(a) providing a first member comprising a channel with a gap;
(b) providing a second member formed of an activatable material;
(c) positioning the fusion splice in the gap overlying the first member and underlying the second member; and
(d) activating the second member to cause the second member to flow over the fusion splice and to engage the first member such that the activatable material at least partially surrounds the fusion splice.

19. The method defined in claim 18, wherein step (d) comprises heating the second member.

20. The method defined in claim 18, wherein the first member is formed of an activatable material.

21. The method defined in claim 20, wherein a third member overlies the second member and mates with the first member to form a cavity, and wherein the second member and the fusion splice reside in the cavity.

22. The method defined in claim 18, wherein a splice protector covers the fusion splice.

* * * * *